United States Patent [19]
Kercher

[11] Patent Number: 5,695,320
[45] Date of Patent: Dec. 9, 1997

[54] TURBINE BLADE HAVING AUXILIARY TURBULATORS

[75] Inventor: David Max Kercher, Ipswich, Mass.

[73] Assignee: General Electric Company, Cincinnati, Ohio

[21] Appl. No.: 809,602

[22] Filed: Dec. 17, 1991

[51] Int. Cl.$^6$ ..................................................... F01D 5/18
[52] U.S. Cl. ........................ 416/97 R; 416/96 A; 415/115
[58] Field of Search ........................ 415/115; 416/97 R, 416/96 A, 232, 233; 89/14.1

[56] References Cited

U.S. PATENT DOCUMENTS

| | | | |
|---|---|---|---|
| 3,628,885 | 12/1971 | Sidenstick et al. | 416/97 |
| 4,180,373 | 12/1979 | Moore et al. | 416/97 R |
| 4,236,870 | 12/1980 | Hucul, Jr. et al. | 416/97 R |
| 4,257,737 | 3/1981 | Andress et al. | 416/97 R |
| 4,278,400 | 7/1981 | Yamarik et al. | 416/97 R |
| 4,416,585 | 11/1983 | Abdel-Messeh | 416/97 R |
| 4,474,532 | 10/1984 | Pazder | 416/97 R |
| 4,514,144 | 4/1985 | Lee | 416/96 R |
| 4,515,526 | 5/1985 | Levengood | 416/96 R |
| 4,775,296 | 10/1988 | Schwarzmann et al. | 415/115 |
| 4,992,026 | 2/1991 | Ohtomo et al. | 415/115 |
| 5,052,889 | 10/1991 | Abdel-Messeh | 416/97 R |

FOREIGN PATENT DOCUMENTS

| | | | |
|---|---|---|---|
| 2112467 | 7/1983 | United Kingdom | F01D 5/18 |

OTHER PUBLICATIONS

J.C. Han et al, "Augmented Heat Transfer in Square Channels With Parallel, Crossed, and V-Shaped Angled Ribs," submitted to ASME Journal of Heat Transfer, Jun. 1990, pp. 1-23 and FIGS. 1-13.

S.D. Spring, "Improved Methods For Determining Heat Transfer," The Leading Edge, Winter 1987/1988, Contents page and pp. 4-9.

Metzger-Vedula-Breen, "The Effect of Rib Angle and Length on Convection Heat Transfer in Rib-Roughened Triangular Ducts," ASME-JSME Thermal Engineering Conference vol. 3, 1987, pp. 327-333.

Metzger-Fan-Yu, "Effects of Rib Angle and Orientation on Local Heat Transfer in Square Channels with Angled Roughness Ribs," *Compact Heat Exchangers*, copyright 1989, pp: Title and 151-167.

*Primary Examiner*—Michael J. Carone
*Assistant Examiner*—Theresa M. Wesson
*Attorney, Agent, or Firm*—Andrew C. Hess; Wayne O. Traynham

[57] ABSTRACT

A gas turbine blade includes an airfoil having first and second sides and an internal passage extending longitudinally therebetween for channeling air to cool the airfoil. A plurality of longitudinally spaced apart primary turbulator ribs extend into the internal passage from at least one of the first and second sides. An auxiliary turbulator rib is spaced between adjacent ones of the primary ribs. The auxiliary rib has a height which is less than the height of the primary ribs for augmenting convective heat transfer enhancement with reduced pressure loss, and, therefore, reduced cooling air requirements.

11 Claims, 4 Drawing Sheets

5,695,320

1

TURBINE BLADE HAVING AUXILIARY TURBULATORS

TECHNICAL FIELD

The present invention relates generally to gas turbine engines, and, more specifically, to air cooled turbine blades and vanes therein.

BACKGROUND ART

In a conventional gas turbine engine, a compressor pressurizes air which is channeled to a combustor, mixed with fuel, and ignited for generating combustion gases which flow to a turbine disposed downstream therefrom. The turbine extracts energy from the hot combustion gases for powering the compressor. Energy from the combustion gases is also used to propel an aircraft in flight, with one or more turbines either driving a conventional fan for obtaining thrust, or simply discharging the combustion gases from a conventional exhaust nozzle for generating thrust for powering the aircraft.

Conventional turbines include one or more stages of stationary stator nozzles or vanes and rotating rotor blades which typically extract energy from the combustion gases by reaction. The blades and vanes are typically air cooled by a portion of the air pressurized by the compressor in order to provide acceptable life in the gas turbine engine. However, any portion of the compressed air which is utilized for cooling the blades and vanes is not available for undergoing combustion which, therefore, reduces the overall efficiency of the engine. Accordingly, it is desirable to use as little of the compressed air as possible in cooling the blades and vanes consistent with obtaining relatively long useful life of the blades and vanes, which is typically accomplished by providing heat transfer enhancement members such as elongate turbulator ribs within the blades and vanes.

Since gas turbine engine blades and vanes include an airfoil portion over which the combustion gases flow, which airfoil portion includes an internal passage for channeling the cooling air and also contains the turbulator ribs, the term blade as used herein shall mean any member placed within the gas turbine engine flowpath over which flows the combustion gases, such as conventional rotor blades or stator vanes or nozzles.

Turbulator ribs typically used in such blades are conventionally formed as part of the blade casting and project inwardly into the internal passage of the blade through which the cooling air is channeled. The ribs enhance the convective heat transfer coefficient along the inner surface of the blade by tripping or disrupting the cooling air boundary layer which is caused to separate from the internal surface and then reattach downstream from the rib. The heat transfer coefficient enhancement is conventionally defined as the convective heat transfer coefficient effected by the ribs divided by the convective heat transfer coefficient over a smooth surface without turbulator ribs, and has values ranging up to several times that of the latter.

Enhancement is conventionally related to the height or projection of the ribs into the internal passage, the distance between opposing walls of the internal passage, and the distance or spacing longitudinally between the ribs. The typical ratio of longitudinal spacing between turbulator ribs relative to rib height ranges from about 5.0 to about 10.0, and the ratio of the rib height to opposing wall distance has values of about 0.07 and up. And, exemplary turbulator ribs may include ribs disposed perpendicularly to the direction of cooling flow, ribs inclined relative to the direction of the cooling airflow, and ribs disposed on opposite walls of the internal passage that are longitudinally positioned either in-line or staggered with respect to each other.

Turbulator ribs provide localized increases in enhancement which decrease rapidly in value downstream from each individual rib. Accordingly, the ribs are typically uniform in configuration, uniform in height or projection into the internal passage, and uniform in longitudinal spacing therebetween for obtaining a generally uniform, or average, enhancement along the surface of the blade cooled by the ribs.

The various conventional turbulator ribs result in different amounts of enhancement, along with pressure losses associated therewith. Since the ribs project into the internal passage and partially obstruct the free flow of the cooling air therethrough, they provide resistance to the flow of the cooling air which results in pressure losses. Although higher ribs generally increase enhancement, the pressure drop associated therewith also increases, which, therefore, typically requires an increase in supply pressure of the cooling airflow to offset the pressure losses. Accordingly, the effectiveness of turbulator ribs must be evaluated by their ability to provide effective enhancement without undesirable levels of pressure losses associated therewith.

OBJECTS OF THE INVENTION

Accordingly, one object of the present invention is to provide a new and improved gas turbine engine blade.

Another object of the present invention is to provide a blade having improved turbulator ribs for increasing enhancement with reduced pressure losses.

Another object of the present invention is to provide a blade having improved enhancement with a reduction in cooling airflow therein for improving blade life and performance of the gas turbine engine.

DISCLOSURE OF INVENTION

A gas turbine blade includes an airfoil having first and second sides and an internal passage extending longitudinally therebetween for channeling air to cool the airfoil. A plurality of longitudinally spaced apart primary turbulator ribs extend into the internal passage from at least one of the first and second sides. An auxiliary turbulator rib is spaced between adjacent ones of the primary ribs. The auxiliary rib has a height which is less than the height of the primary ribs.

BRIEF DESCRIPTION OF DRAWINGS

The novel features believed characteristic of the invention are set forth and differentiated in the claims. The invention, in accordance with preferred and exemplary embodiments, together with further objects and advantages thereof, is more particularly described in the following detailed description taken in conjunction with the accompanying drawings in which:

MODE(S) FOR CARRYING OUT THE INVENTION

Figures 1, 2:
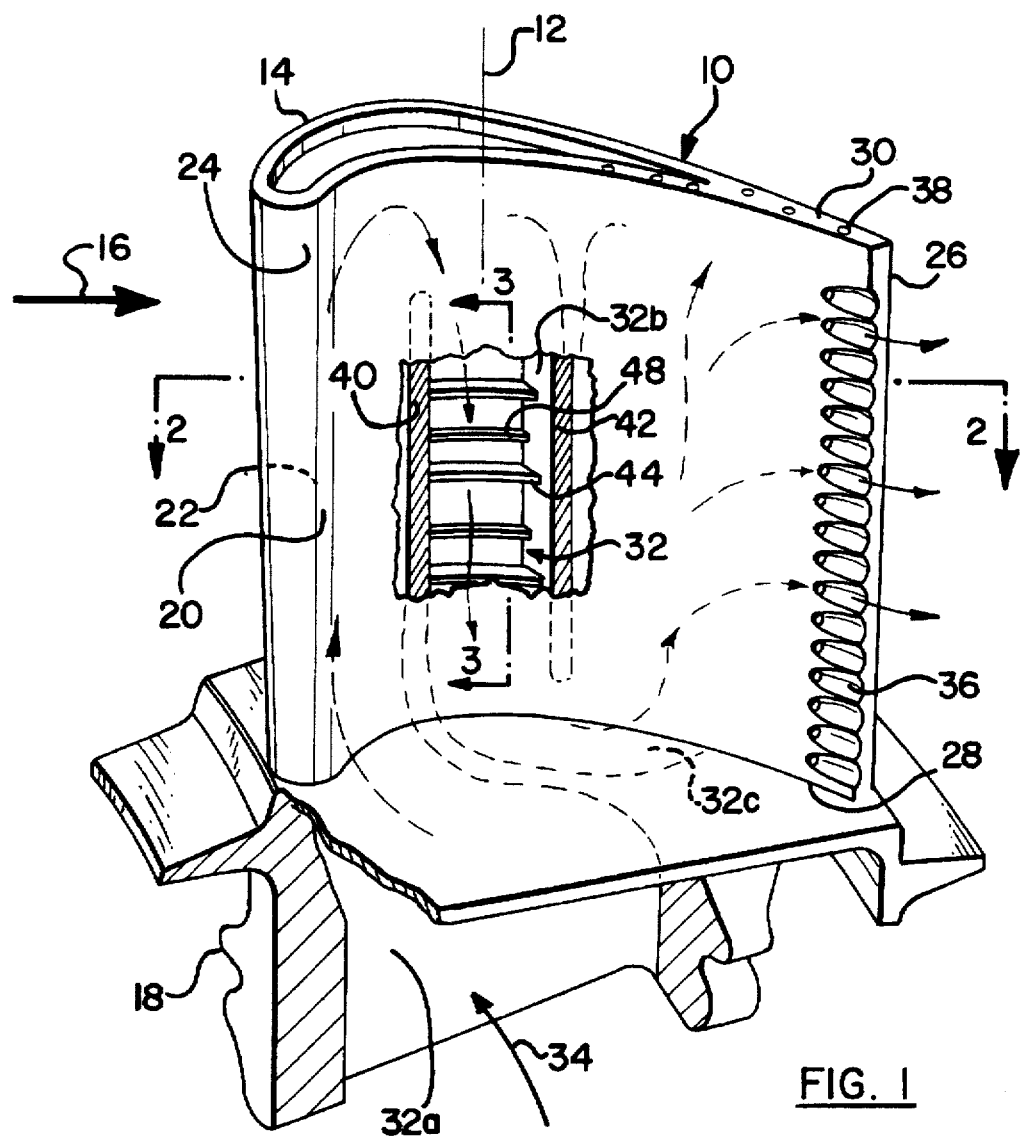
FIG. 1 is a schematic, perspective, partly cutaway view of an exemplary gas turbine engine blade having turbulator ribs in accordance with a first embodiment of the present invention.
FIG. 2 is a transverse sectional view of the blade illustrated in FIG. 1 taken along line 2—2.

Illustrated schematically in FIG. 1 is an exemplary gas turbine engine rotor blade 10 having a longitudinal or radial axis 12. The blade 10 includes an airfoil 14 which is conventionally disposed in a gas turbine engine (not shown) and over which flows hot combustion gases 16 generated by a conventional combustor (not shown). As used herein, the term blade shall mean any member disposed within a hot gas flow such as the combustion gases 16 and, for example, includes the rotor blade 10 illustrated, and stator vanes or nozzles. The blade 10 as a rotor blade is conventionally joined to a rotor disk (not shown) by a conventional dovetail 18 extending downwardly from the airfoil 14. The blade 10 may also represent a conventional stator vane or nozzle wherein the airfoil 14 is conventionally joined to a stator casing and conventionally channels the combustion gases 16 to conventional rotor blades disposed downstream therefrom (not shown).

The outer configuration of the airfoil 14 is conventional and includes a first sidewall, or side, 20, which is also known as the concave or pressure side of the airfoil 14, and a second sidewall, or side, 22, which is also known as the convex or suction side of the airfoil 14. The first and second sides 20 and 22 are joined together at a longitudinally extending leading edge 24 and a trailing edge 26 and extend longitudinally from a root 28 to a tip 30. The root 28 is the lowermost portion of the airfoil 14 over which the combustion gases 16 flow, and the tip 30 is the outermost portion of the airfoil 14 over which the gases 16 flow.

Referring to both FIGS. 1 and 2, the airfoil 14 includes an internal passage 32 which extends longitudinally between the first and second sides 20 and 22 for channeling compressed air 34 as cooling air to cool the airfoil 14. More specifically, the cooling air 34 is conventionally channeled from a compressor of the gas turbine engine (not shown) through the dovetail 18 and upwardly into the airfoil 14. The passage 32 in the exemplary embodiment illustrated is a serpentine passage including a leading edge passage 32a which extends from the dovetail 18 upwardly through the airfoil 14 to the tip 30 wherein the air 34 is turned 180° into a midchord passage 32b and flows longitudinally downwardly in the airfoil 14 to the root 28 wherein the air 34 is again turned 180° upwardly into a trailing edge passage 32c which extends to the tip 30. The air 34 from the trailing edge passage 32c is conventionally discharged from the airfoil 14 through a plurality of trailing edge apertures 36 and tip holes 38 for example.

In the exemplary embodiment illustrated in FIGS. 1 and 2, the internal passage 32 is defined between the first and second sides 20 and 22, with the three portions thereof being additionally defined by an upwardly extending first partition 40 extending from the dovetail 18 longitudinally upwardly between the first and second sides 20 and 22 to form a gap with the tip 30 for allowing the air 34 to turn from the leading edge passage 32a downwardly into the midchord passage 32b. A second partition 42 is spaced aft of the first partition 40 and extends downwardly from the tip 30 toward the root 28 to form a gap adjacent to the dovetail 18 in which the cooling air 34 turns from the midchord passage 32b upwardly into the trailing edge passage 32c.

The blade 10 as so configured above is conventional but includes improved heat transfer enhancement in accordance with the present invention. More specifically, a plurality of longitudinally spaced apart and parallel, elongate primary turbulator ribs 44 extend perpendicularly inwardly from at least one, and preferably both, of the first and second sides 20 and 22 into the passage 32, such as the midchord passage 32b illustrated in FIGS. 1 and 2.

Figure 3:
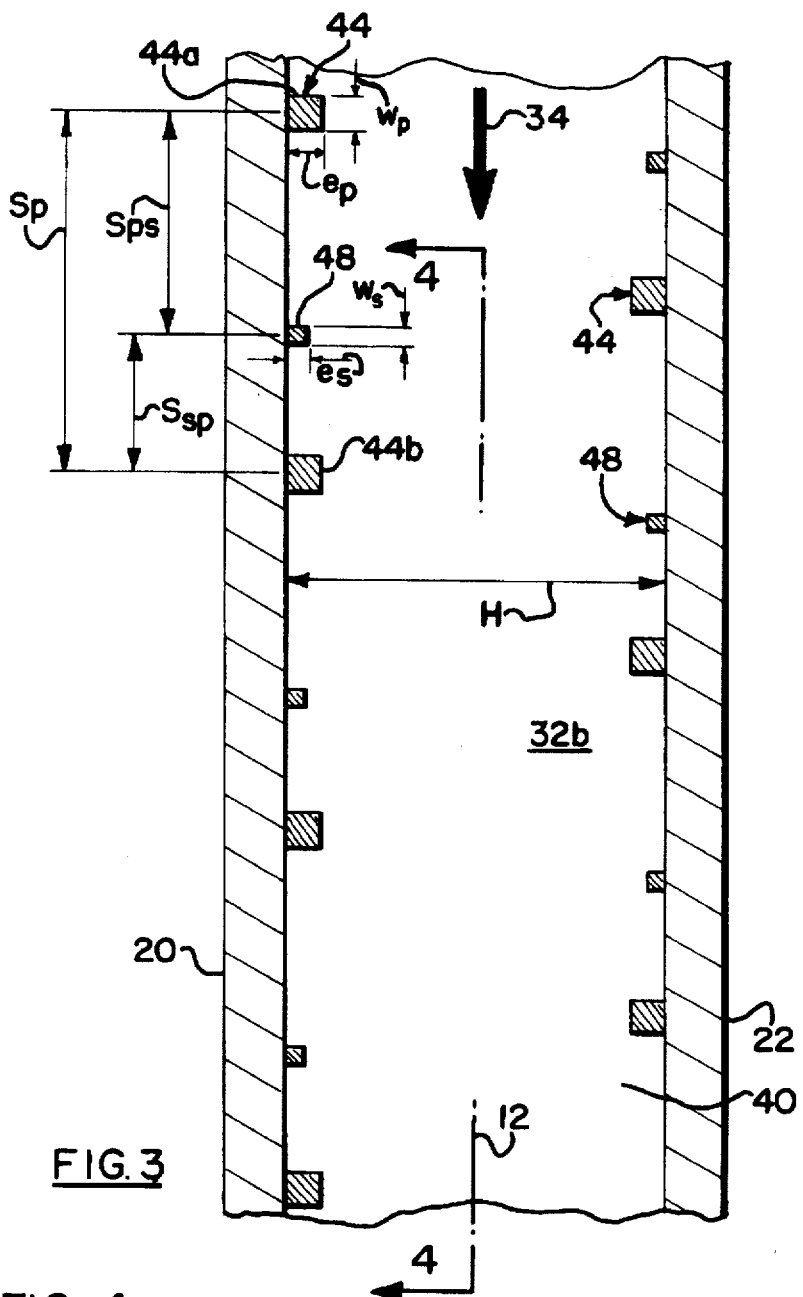
FIG. 3 is a longitudinal sectional view of a portion of a midchord passage of the blade illustrated in FIG. 1 taken along line 3—3.
Figure 4:
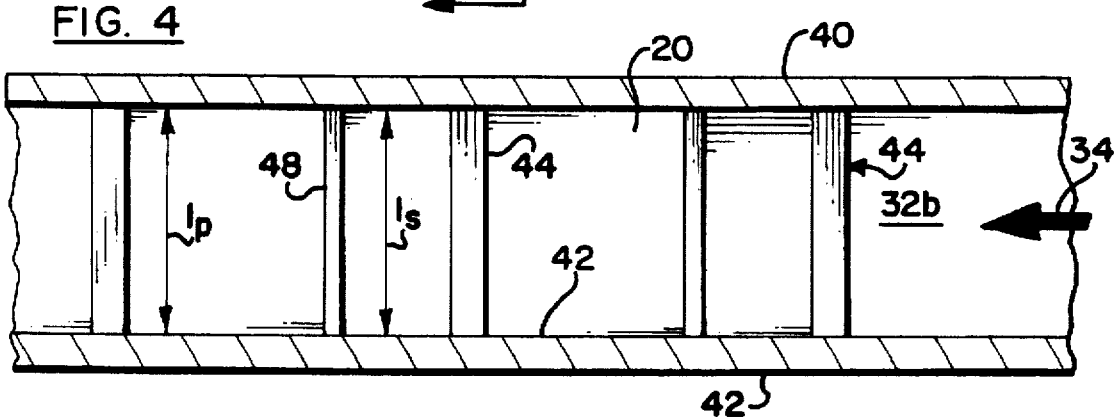
FIG. 4 is a longitudinal, partly sectional view of the midchord passage illustrated in FIG. 3 taken along line 4—4.

As shown in more particularity in FIGS. 3 and 4 for the exemplary midchord passage 32b, the primary ribs 44 extend completely along the first and second sides 20 and 22 between the first and second partitions 40 and 42 and have a length $l_p$ measured along the chordal direction between the leading edge 24 and the trailing edge 26 (see also FIG. 1). Each of the primary ribs 44 has a generally uniform transverse cross section, which in the exemplary embodiment illustrated is square with a height $e_p$ measured perpendicularly inwardly from the respective first and second sides 20 and 22 into the midchord passage 32b, and a width $w_p$ measured along the longitudinal axis 12 in the flow direction of the cooling air 34. The primary ribs 44 are conventionally longitudinally spaced apart for providing a suitable average enhancement, or convective heat transfer coefficient relative to the heat transfer coefficient of a smooth wall without the primary ribs 44.

More specifically, and as shown in FIG. 3, several primary ribs 44 having equal heights $e_p$ are uniformly disposed at equal longitudinal spacings $S_p$ therebetween. For example, adjacent ones of the primary ribs 44 include a first primary rib 44a disposed at the longitudinal spacing $S_p$ from a second primary rib 44b disposed downstream therefrom, with the longitudinal spacing $S_p$ being measured from identical planes of the primary ribs 44a, 44b such as their centerlines as shown. The longitudinal spacing $S_p$ divided by the rib height $e_p$ defines an $S_p/e_p$ ratio for the primary ribs 44. The $S_p/e_p$ ratio is equal for the several primary ribs 44 and may conventionally range from about 5.0 up to about 10.0, for example.

Figure 5:
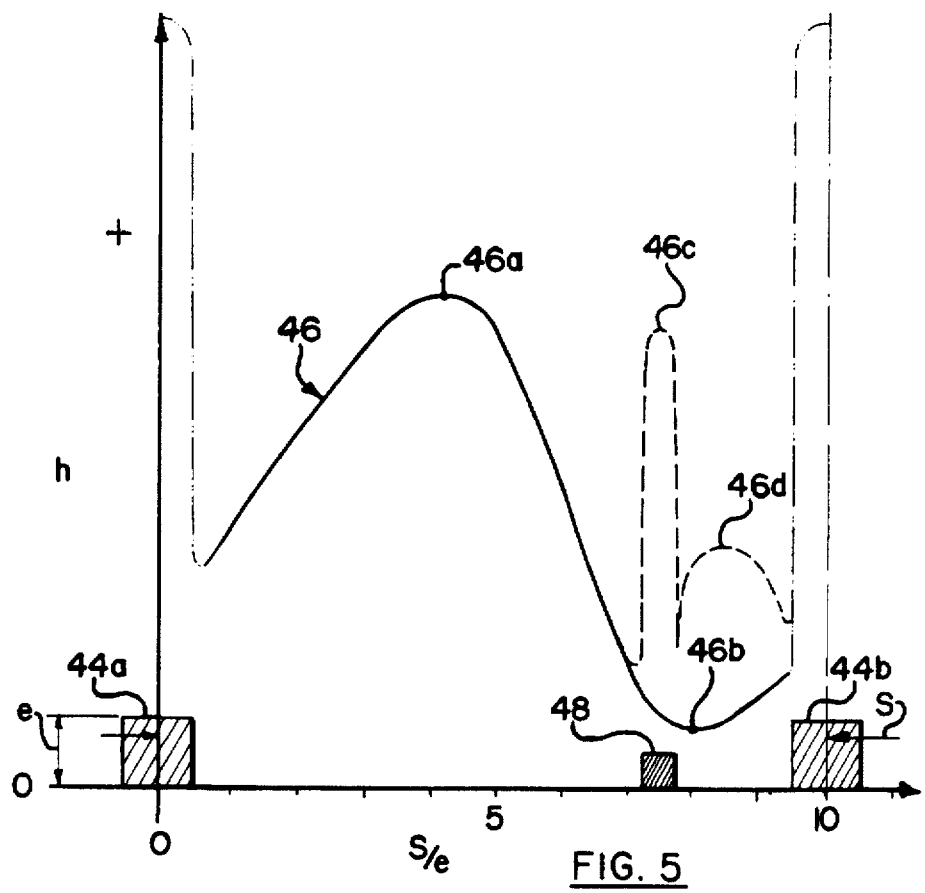
FIG. 5 is a graph plotting heat transfer coefficient h versus an S/e ratio.

Illustrated in FIG. 5 is a schematic graph plotting the conventionally known longitudinal spacing to rib height ratio S/e on the abscissa versus the conventionally known convective heat transfer coefficient h on the ordinate. Superimposed on the abscissa are two adjacent turbulator ribs, such as the ribs 44a and 44b disposed at an S/e ratio of 10.0. Improved testing procedures for opposite wall turbulators suggest that the actual variation in heat transfer coefficient h between adjacent turbulator ribs varies as represented by the first curve 46 illustrated therein in solid line, which applies in principal to performance of turbulators on a single wall as well. Note that directly over each of the ribs 44a, 44b is a conventional heat transfer peak shown in phantom. As shown in FIG. 5, the heat transfer coefficient h increases downstream from a turbulator rib to a first local maximum value 46a at a location having an S/e ratio of about 4–5, and thereafter decreases to a local minimum value 46b just before the next adjacent turbulator rib at an S/e ratio of about 8. It then again increases in a repeating fashion from the next turbulator rib to the succeeding turbulator rib disposed downstream therefrom.

In accordance with the present invention, a smaller in height auxiliary or secondary turbulator rib 48 is provided between two adjacent primary ribs 44a and 44b, to improve the heat transfer coefficient h between the local maximum and minimum points 46a and 46b and between the ribs 44a, 44b as shown generally in dashed line in FIG. 5. By introducing the additional secondary turbulator rib 48, increased heat transfer area due to the rib 48 itself is provided which enhances heat transfer, and the secondary rib 48 affects the flow of the cooling air 34 at the boundary layer adjacent thereto to provide a second, local, maximum value 46c of the heat transfer coefficient h at the location associated with the secondary turbulator rib 48. The secondary turbulator rib 48 also effects a third, local, maximum value 46d between the secondary rib 48 and the next succeeding primary rib (44b). In this way, the first curve 46 is altered by the secondary rib 48 for providing local increases in the heat transfer coefficient at the secondary rib 48 and between the secondary rib 48 and the succeeding primary rib 44b, with corresponding values of the heat transfer coefficient h being greater than those represented by the original first curve 46. Accordingly, the average heat transfer coefficient h associated with the use of the smaller secondary rib 48 between the larger adjacent primary ribs 44a and 44b is larger than that associated with the primary ribs 44a and 44b alone. The first curve 46 illustrated in FIG. 5 suggests that such increased enhancement may be obtained for conventional uniformly sized and spaced turbulator ribs having S/e ratios resulting in heat transfer coefficient curves such as the first curve 46 having the first maximum 46a and the minimum 46b. Such curves 46 will occur, for example, with S/e ratios of about 10, as well as less than 10.0 down to about 7.5, and greater than 10 up to about 15.

However, since the S/e ratio is a significant factor in obtaining enhancement, the addition of another turbulator rib between conventionally spaced, equal sized turbulator ribs must be configured to ensure that the S/e ratio of each of the ribs does not by itself adversely affect enhancement. For example, if two conventional turbulator ribs have an S/e ratio of 10, and an equal sized turbulator rib is disposed equidistantly therebetween, the resulting S/e ratio between the first and middle rib, and between the middle and third rib will be 5.0, which is substantially different than the originally designed-for S/e ratio of 10, and will affect the enhancement.

Referring again to FIGS. 3 and 4, the secondary turbulator rib 48 is preferably disposed between adjacent ones of the primary turbulator ribs 44 at a preferred S/e ratio in accordance with the present invention for maximizing the enhancement increase obtainable from conventionally spaced primary ribs 44. More specifically, each of the secondary ribs 48 has a height $e_s$ measured perpendicularly inwardly into the midchord passage 32b which is less than the height $e_p$ of the primary ribs 44. The secondary ribs 48 preferably also have square transverse cross sections, with a width $w_s$ measured in the longitudinal direction which is equal to the height $e_s$, and, as shown in FIGS. 2 and 4, the secondary ribs 48 also extend completely along the first and second sides 20 and 22 in the midchord passage 32b with a length $l_s$, and are disposed parallel to the primary ribs 44.

Since the first and second primary ribs 44a and 44b are disposed at the longitudinal spacing $S_p$ therebetween, and have equal heights $e_p$, an $S_p/e_p$ ratio is defined thereby. The secondary rib 48 is longitudinally spaced from the first primary rib 44a at a longitudinal spacing $S_{ps}$ to define an $S_{ps}/e_p$ ratio for the first primary rib 44a relative to the secondary rib 48. Similarly, the secondary rib 48 is disposed at a longitudinal spacing $S_{sp}$ relative to the second primary rib 44b to define an $S_{sp}/e_s$ ratio for the smaller secondary rib 48 relative to the second primary rib 44b. In the preferred embodiment of the invention, the ratios $S_{ps}/e_p$ and $S_{sp}/e_s$ are substantially equal to each other and less than the $S_p/e_p$ ratio. Also in the preferred embodiment, the ratios $S_{ps}/e_p$ and $S_{sp}/e_s$ are preferably equal to about 7.5 which is associated with the placement of the secondary rib 48 generally as shown in FIG. 5 for maximizing the heat transfer enhancement both from the first primary turbulator 44a to the secondary turbulator 48, and from the secondary turbulator 48, to the second primary turbulator 44b.

In an exemplary embodiment wherein the secondary ribs 48 are half the size of the primary ribs 44 with $e_s$ being half of $e_p$, and $w_s$ being half of $w_p$, e.g. 0.25×0.25 mm versus 0.5×0.5 mm, equal ratios $S_{ps}/e_p$ and $S_{sp}/e_s$ mathematically requires that the longitudinal spacing $S_{ps}$ is equal to ⅔ $S_p$, and the spacing $S_{sp}$ is equal to ⅓ $S_p$ as shown in FIG. 5. In this embodiment for the ratio $S_p/e_p$ equal to 10, the ratios $S_{ps}/e_p$ and $S_{sp}/e_s$ are both equal to 6.7 for providing a maximum average enhancement between the primary ribs 44a and 44b due to the smaller secondary rib 48.

For alternate embodiments, the secondary ribs 48 may be other fractions in height $e_s$ compared to the height $e_p$ of the primary ribs 44, with corresponding values of the ratios $S_{ps}/e_p$ and $S_{sp}/e_s$. For example, for $e_s$ equal to ⅔ $e_p$, the corresponding value is 6. And, for the preferred embodiment having the ratios $S_{ps}/e_p$ and $S_{sp}/e_s$ equal to 7.5, $e_s$ is equal to ⅓ $e_p$ for $S_p/e_p$ equal to 10.

The relative size of the secondary ribs 48 may be determined by the following equation for given values of the ratios $S_p/e_p$ and $S_{ps}/e_p$, wherein $S_{ps}/e_p$ is equal to $S_{sp}/e_s$:

$$\frac{e_s}{e_p} = \frac{S_p/e_p}{S_{ps}/e_p} - 1.$$

Accordingly, by introducing the smaller secondary ribs 48 between adjacent ones of the larger primary ribs 44, enhancement may be increased for improving blade life and reducing the amount of the cooling air 34 which would otherwise be needed for effectively cooling the blade 10, with a respective improvement in performance of the gas turbine engine having such improved blades 14.

The use of a smaller secondary turbulator rib 48 between equally sized larger primary turbulator ribs 44 may be used for improving enhancement in various types of conventional turbulator rib configurations. In the exemplary embodiments illustrated in FIGS. 1–4, both the primary and secondary ribs 44 and 48 are disposed in the midchord passage 32b perpendicularly to the longitudinal direction of the cooling air 34 flowing through the midchord passage 32b along the longitudinal axis 12. As shown in FIG. 3, for example, the primary ribs 44 on the first side 20 of the airfoil 14 are preferably longitudinally staggered equidistantly between and relative to the primary ribs 44 on the second side 22 of the airfoil 14.

Figure 6:
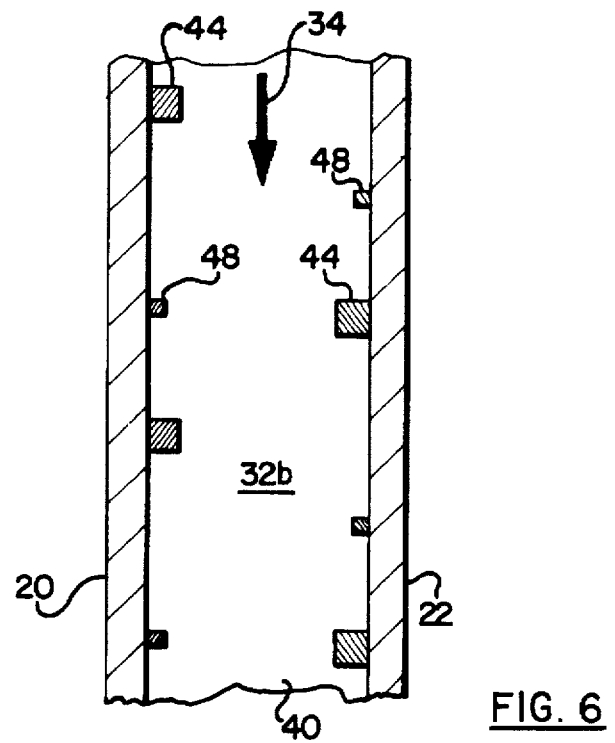
FIG. 6 is a longitudinal sectional view of a midchord passage similar to FIG. 3 illustrating a second embodiment of the present invention.

Illustrated in FIG. 6 is another longitudinally staggered configuration of the primary ribs 44 on the opposite first and second sides 20 and 22 wherein the primary ribs 44 on the second side 22 are disposed longitudinally between the primary ribs 44 on the first side 20, but, the secondary ribs 48 on the first side 20 are longitudinally aligned with, or disposed in-line with, the primary ribs 44 on the second side 22. In both of the staggered configurations illustrated in FIGS. 3 and 6, the first and second sides 20 and 22 are spaced apart at a distance H, with the primary ribs 44 having conventional $e_p/H$ ratios, for example about 0.07 and higher. Although the parameter H represents the sidewall spacing in this exemplary embodiment, the conventionally known hydraulic diameter D, which is four times the maximum flow area divided by the wetted perimeter, may also be used instead. However, the staggered arrangement illustrated in FIG. 3 ensures that no two of the primary and secondary ribs 44 and 48 on opposing sides 20 and 22 are directly opposite to each other, or longitudinally in-line, for reducing pressure losses of the cooling air 34 being channeled therethrough. In the FIG. 6 configuration, a smaller secondary rib 48 is disposed in-line with a larger primary rib 44 on the opposite side, with the opposing larger primary ribs 44 being staggered relative to each other for reducing pressure losses therein.

Figure 7:
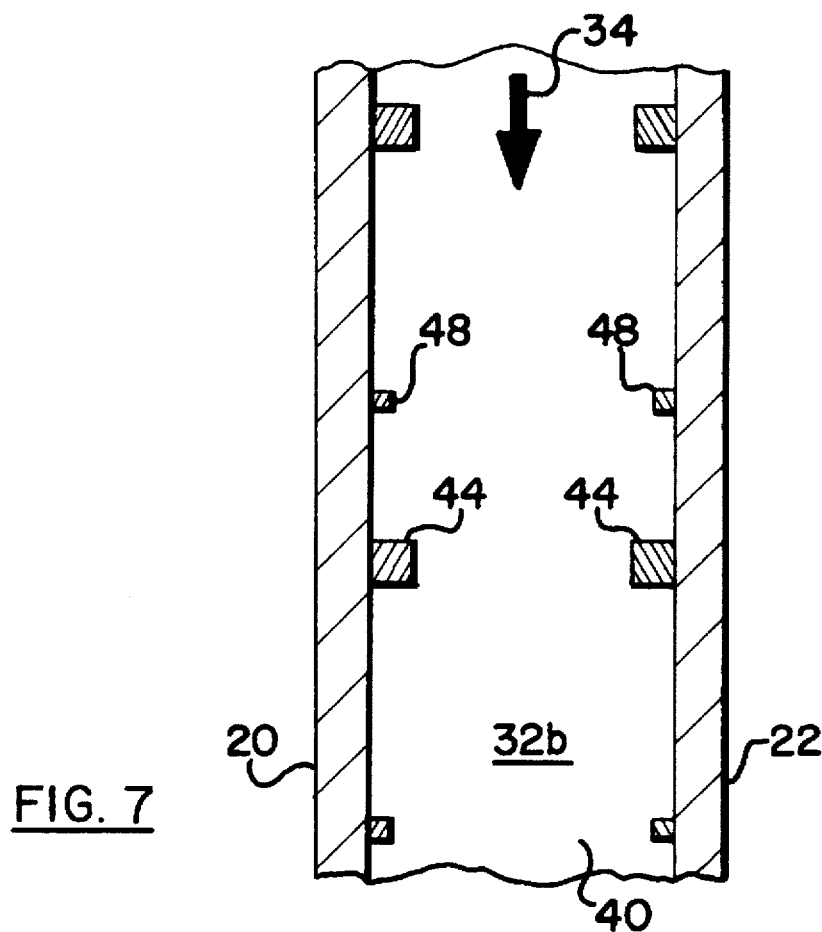
FIG. 7 is a longitudinal sectional view of a midchord passage similar to FIG. 3 illustrating a third embodiment of the present invention.

And, illustrated in FIG. 7, is yet another embodiment of the invention wherein both the opposing primary ribs 44 and the opposing secondary ribs 48 are longitudinally aligned, or in-line, with each other.

Figure 8:
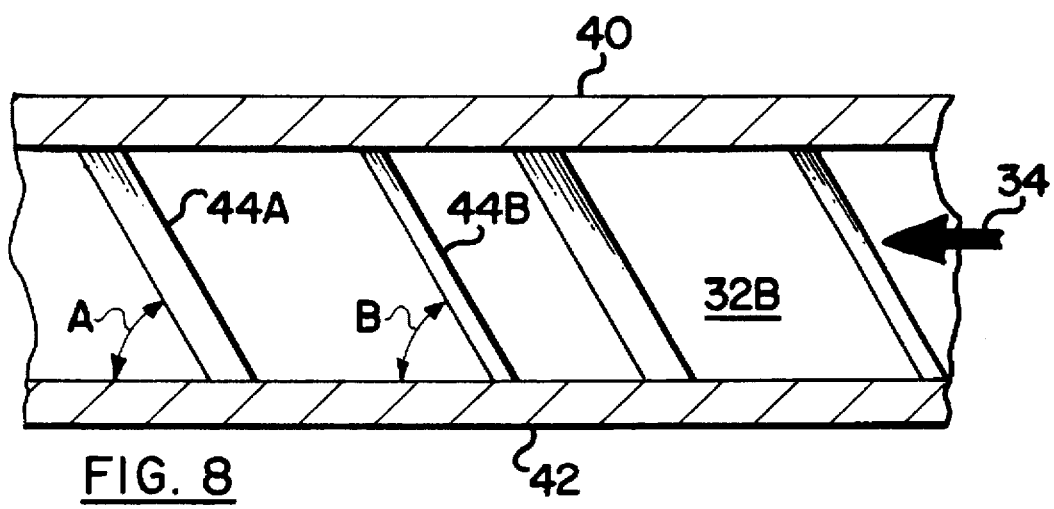
FIG. 8 is a longitudinal, partly sectional view of a midchord passage similar to FIG. 4 illustrating a fourth embodiment of the present invention.

And, in FIG. 8, yet another embodiment of the invention is illustrated wherein the primary and secondary ribs designated 44A and 44B are angled or inclined at acute angles A and B, respectively, relative to the second partition 42, or the first partition 40, or the longitudinal direction of the cooling air 34, which angles may be equal for example.

As the several embodiments suggest, the use of the smaller secondary ribs 48 between the larger primary ribs 44 may be utilized for improving enhancement in various types of conventionally configured turbulators. Although the invention has been described in particularity with respect to the midchord passage 32b illustrated in FIGS. 1 and 2, it may also be applied to advantage in any internal passage within the blade 14 including the leading edge passage 32a and the trailing edge passage 32c. As shown in FIG. 2, the ribs 44, 48 in the leading edge passage 32a are transversely spaced apart at the first partition 40, but join each other near the leading edge 40 in the transverse plane. And, the ribs 44, 48 in the trailing edge passage 33c are transversely spaced apart at the second partition 42, and correspondingly taper and decrease in height toward the trailing edge 26.

Since the preferred rib spacing to height ratio S/e is about 7.5, the invention has particular utility where conventional, large turbulator ribs are uniformly spaced apart at S/e ratios greater than about 7.5 and less than about 15. For an S/e ratio of about 7.5 for conventional equal sized turbulator ribs, FIG. 5 suggests no improvement in enhancement by providing a smaller secondary turbulator 48 therebetween. For an S/e ratio of 15 for equal sized turbulator ribs, the use of yet another equal sized turbulator rib spaced equidistantly therebetween would effect S/e ratios between each of the ribs and the next succeeding rib of 7.5. For S/e ratios between about 7.5 and about 15 for equal sized turbulator ribs, i.e. the primary ribs 44, the smaller secondary ribs 48 may be used for improving enhancement in accordance with the teachings of the present invention. The smaller secondary ribs 48 not only provide local enhancement of the heat transfer coefficient between the adjacent primary ribs 44, but since they are smaller in size than the primary ribs 44, they introduce a correspondingly reduced pressure drop than that effected by the primary ribs 44 for providing an improved blade having reduced cooling air flow requirements.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention. For example, other types of turbulator ribs may also be used in accordance with the invention to provide the functional effect of the primary and secondary ribs disclosed herein, including V-shaped ribs.

Accordingly, what is desired to be secured by Letters Patent of the United States is the invention as defined and differentiated in the following claims:

I claim:

1. A gas turbine engine blade having a longitudinal axis comprising:

an airfoil having a first side and an opposite second side joined together at a leading edge and a trailing edge and extending longitudinally from a root to a tip, and an internal passage extending longitudinally between said first and second sides for channeling air to cool said airfoil;

a plurality of longitudinally spaced apart and parallel primary turbulator ribs extending from at least one of said first and second sides into said passage at equal heights $e_p$; and a secondary turbulator rib extending from said at least one of said first and second sides into said passage at a height $e_s$ and spaced between and parallel to adjacent ones of said primary ribs, said height $e_s$ being less than said height $e_p$.

2. A blade according to claim 1 wherein:

said adjacent primary ribs include a first primary rib disposed at a longitudinal spacing $S_p$ from a second primary rib to define an $S_p/e_p$ ratio;

said secondary rib is disposed at a longitudinal spacing $S_{ps}$ relative to said first primary rib to define an $S_{ps}/e_p$ ratio, and at a longitudinal spacing $S_{sp}$ relative to said second primary rib to define an $S_{sp}/e_s$ ratio; and said ratios $S_{ps}/e_p$ and $S_{sp}/e_s$ are substantially equal to each other and less than said $S_p/e_p$ ratio.

3. A blade according to claim 2 wherein said ratios $S_{ps}/e_p$ and $S_{sp}/e_s$ are equal to about 7.5.

4. A blade according to claim 2 wherein said cooling air flows through said passage in a longitudinal direction, and said primary and secondary ribs are disposed in said passage perpendicularly to said longitudinal direction.

5. A blade according to claim 2 wherein said cooling air flows through said passage in a longitudinal direction, and said primary and secondary ribs are inclined relative to said longitudinal direction in said passage.

6. A blade according to claim 2 wherein said primary and secondary ribs extend completely along said at least one of said first and second sides in said passage.

7. A blade according to claim 2 wherein said primary and secondary ribs are disposed on both of said first and second sides in said passage, and said primary ribs of said first side are staggered relative to said primary ribs on said second side.

8. A blade according to claim 2 wherein said primary and secondary ribs are disposed on both of said first and second sides in said passage, and said primary ribs of said first side are longitudinally aligned with said primary ribs on said second side.

9. A blade according to claim 4 wherein said primary and secondary ribs are disposed on both of said first and second sides and extend completely along said first and second sides in said passage.

10. A blade according to claim 9 wherein said primary ribs of said first side are staggered relative to said primary ribs on said second side, and said ratios $S_{ps}/e_p$ and $S_{sp}/e_s$ are equal to about 7.5.

11. A blade according to claim 2 wherein said primary rib height $e_p$ and said secondary rib height $e_s$ are related to each other in accordance with:

$$\frac{e_s}{e_p} = \frac{S_p/e_p}{S_{ps}/e_p} - 1.$$

* * * * *